United States Patent
Shishido et al.

(10) Patent No.: US 9,682,286 B2
(45) Date of Patent: Jun. 20, 2017

(54) BALL FOR BALL GAMES, AND METHOD FOR MANUFACTURING BALL FOR BALL GAMES

(71) Applicants: Hideomi Shishido, Hiroshima (JP); Vikas Gupta, Punjab (IN); Vinod Mahajan, Punjab (IN)

(72) Inventors: Hideomi Shishido, Hiroshima (JP); Vikas Gupta, Punjab (IN); Vinod Mahajan, Punjab (IN)

(*) Notice: Subject to any disclaimer, the term of this patent is extended or adjusted under 35 U.S.C. 154(b) by 0 days.

(21) Appl. No.: 15/213,970

(22) Filed: Jul. 19, 2016

(65) Prior Publication Data

US 2017/0072270 A1 Mar. 16, 2017

Related U.S. Application Data

(63) Continuation of application No. PCT/JP2015/075849, filed on Sep. 11, 2015.

(51) Int. Cl.
*A63B 41/08* (2006.01)
*A63B 45/00* (2006.01)
(Continued)

(52) U.S. Cl.
CPC .............. *A63B 41/08* (2013.01); *A63B 45/00* (2013.01); *B29C 65/4835* (2013.01);
(Continued)

(58) Field of Classification Search
CPC ....... A63B 41/08; A63B 41/00; A63B 41/085; A63B 45/00; B29L 2031/545; B29C 65/4835; B29C 65/62; B29C 65/72
See application file for complete search history.

(56) References Cited

U.S. PATENT DOCUMENTS

| | | | | |
|---|---|---|---|---|
| 1,187,029 A | * | 6/1916 | Beebout | A63B 41/08 |
| | | | | 156/213 |
| 1,240,866 A | * | 9/1917 | Miller | A63B 41/08 |
| | | | | 473/596 |

(Continued)

FOREIGN PATENT DOCUMENTS

| | | |
|---|---|---|
| DE | 11 2008 001 626 T5 | 7/2010 |
| JP | 2003-033448 A | 2/2003 |

(Continued)

OTHER PUBLICATIONS

International Search Report issued in PCT/JP2015/075849; mailed Dec. 22, 2015.

(Continued)

*Primary Examiner* — Steven Wong
(74) *Attorney, Agent, or Firm* — Studebaker & Brackett PC

(57) ABSTRACT

The ball for ball games has a ball body and a spherical shell-shaped outer layer having a plurality of leather panels and disposed on the outside of the ball body. The plurality of leather panels each have a main body and an extending portion that is thinner than the main body and extends from a front-side portion of an outer end surface of the main body to configure an outer end surface of the leather panel. The extending portions of adjacent leather panels are bonded to each other with an adhesive and stitched together with a stitching thread. In the ball for ball games, the extending portion is provided with a reinforcing member for reinforcing an area thereof stitched with the stitching thread.

7 Claims, 16 Drawing Sheets

(51) Int. Cl.

| | | |
|---|---|---|
| B29C 65/48 | (2006.01) | |
| B29C 65/72 | (2006.01) | |
| B29C 65/62 | (2006.01) | |
| B29C 65/00 | (2006.01) | |
| B29L 31/54 | (2006.01) | |

(52) U.S. Cl.
 CPC .............. *B29C 65/62* (2013.01); *B29C 65/72* (2013.01); *B29C 66/7484* (2013.01); *B29L 2031/545* (2013.01)

(56) References Cited

U.S. PATENT DOCUMENTS

| | | | | |
|---|---|---|---|---|
| 1,923,236 | A * | 8/1933 | Sonnett | A63B 41/08 473/599 |
| 2,244,503 | A * | 6/1941 | Riddell | A63B 41/08 473/597 |
| 3,119,618 | A * | 1/1964 | Molitor | A63B 41/00 273/DIG. 8 |
| 4,462,590 | A * | 7/1984 | Mitchell | A63B 41/08 273/DIG. 8 |
| 5,752,890 | A * | 5/1998 | Shishido | A63B 41/08 473/599 |
| 5,997,422 | A * | 12/1999 | Cooper | A63B 41/08 473/599 |
| 6,039,662 | A | 3/2000 | Chan | |
| 6,302,815 | B1 * | 10/2001 | Shishido | A63B 41/08 473/598 |
| 6,348,018 | B1 * | 2/2002 | Ou | A63B 41/08 473/143 |
| 6,390,941 | B1 | 5/2002 | Ou | |
| 6,726,583 | B1 * | 4/2004 | Lai | A63B 41/10 473/599 |
| 7,749,116 | B2 | 7/2010 | Tang et al. | |
| 8,991,033 | B1 * | 3/2015 | Hussain | A63B 41/02 29/527.1 |
| 9,011,621 | B1 * | 4/2015 | Hussain | A63B 41/08 156/147 |
| 9,186,559 | B1 * | 11/2015 | Hussain | A63B 41/02 |
| 2002/0086749 | A1 * | 7/2002 | Ou | A63B 41/00 473/604 |
| 2003/0228946 | A1 | 12/2003 | Chan | |
| 2004/0018902 | A1 * | 1/2004 | Hu | A63B 41/08 473/604 |
| 2006/0046880 | A1 * | 3/2006 | Tang | A63B 41/08 473/604 |
| 2009/0325745 | A1 | 12/2009 | Rapaport et al. | |
| 2010/0248873 | A1 * | 9/2010 | Cooper | A63B 41/08 473/599 |
| 2011/0253292 | A1 | 10/2011 | Chen | |
| 2012/0258824 | A1 * | 10/2012 | Berggren | A63B 41/08 473/604 |
| 2013/0005521 | A1 | 1/2013 | White et al. | |
| 2013/0035182 | A1 * | 2/2013 | Sing | A63B 41/08 473/605 |

FOREIGN PATENT DOCUMENTS

| | | |
|---|---|---|
| JP | 2009-006052 A | 1/2009 |
| JP | 2009-254636 A | 11/2009 |

OTHER PUBLICATIONS

Written Opinion issued in PCT/JP2015/075849; mailed Dec. 22, 2015.

The extended European search report issued by the European Patent Office on Jan. 24, 2017, which corresponds to European Patent Application No. 16001594.7-1658 and is related to U.S. Appl. No. 15/213,970.

* cited by examiner

PRIOR ART

PRIOR ART

BALL FOR BALL GAMES, AND METHOD FOR MANUFACTURING BALL FOR BALL GAMES

TECHNICAL FIELD

The present invention relates to a ball for ball games and a method for manufacturing the ball for ball games.

BACKGROUND ART

There has conventionally been known a ball for ball games that has a ball body and an outer layer that is configured by stitching adjacent leather panels together and covers the ball body. This type of ball for ball games is disclosed in, for example, Patent Literature 1 and 2.

The ball for ball games disclosed in Patent Literature 1 has a ball body 57 consisting of a bladder 52 and a reinforcing layer 53, and an outer layer 55 disposed on the outside of the ball body 57, as shown in FIG. 14. The outer layer 55 has a plurality of leather panels 54. The leather panels 54 each have a leather 54c and a foam material 54d bonded to the rear surface of the leather 54c. A peripheral portion of each leather panel 54 has a folding portion 59, wherein the adjacent leather panels 54, 54 are stitched together with a stitching thread 63 at the folding portion 59.

In this ball for ball games, the foam material 54d is bonded to the rear surface of the leather 54c, and an outer end portion of the leather panel 54 is thinner than the center of the leather panel 54. Therefore, the peripheral portion of the leather panel 54 is not bulging, and the ball feels soft. Moreover, the leather panels 54 are bonded to each other, preventing water from seeping into the leather panels 54 from between the leather panels 54, 54.

However, stitching the foam materials 54d together at the folding portions 59 of the leather panels 54 generates weak sewing strength. As a result, seam tear and stitch-skipping are likely to occur at the time of sewing. In addition, because the strength of the foam materials 54d is extremely lower than that of the stitching thread 63, the foam material 54d and the leather 54c tear at the stitched portion when the ball is subjected to impact when kicked, resulting in a critical problem that the leather panels 54 come off.

In the ball for ball games disclosed as an embodiment in Patent Literature 2 as well, the peripheral portion of each leather panel 54 is not bulging due to the presence of a pad material 65 as shown in FIG. 15, and the ball feels soft. However, because the adjacent leather panels 54, 54 are not bonded to each other, the force that splits the adjacent panels 54, 54 apart acts on the stitched portion between the leather panels 54 when the ball for ball games is in use, possibly exposing the stitching thread 63. In addition, sewing strength is weak because the leathers 54c are stitched together. Consequently, seam tear and stitch-skipping are likely to occur. There is also a risk that this action of the force splitting the adjacent leather panels 54, 54 apart might tear the stitching thread 63. Furthermore, water is absorbed between the leather panels 54, 54.

The ball for ball games disclosed as an embodiment in Patent Literature 2 has a lining layer 67, as shown in FIG. 16. This lining layer 67 is stitched together with the leather 54c and an intermediate layer 69, providing high sewing strength. In this embodiment, however, the adjacent leather panels 54, 54 are not bonded to each other, and due to the absence of the pad material 65, the peripheral portion of each leather panel 54 bulges. As a result, when this ball for ball games is in use, the force that splits the adjacent panels 54, 54 apart acts more easily on the stitched portion of each leather panel 54, compared to the embodiment shown in FIG. 15. Consequently, the stitching thread 63 becomes exposed easily. In addition, there is a risk that this action of the force splitting the adjacent leather panels 54, 54 apart might tear the stitching thread 63.

CITATION LIST

Patent Literature

PTL 1: U.S. Pat. No. 7,749,116
PTL 2: U.S. Pat. No. 6,390,941

SUMMARY OF INVENTION

An object of the present invention is to provide a ball for ball games and a method for manufacturing a ball for ball games, which can solve the foregoing problems.

A ball for ball games according to one aspect of the present invention has a ball body and a spherical shell-shaped outer layer having a plurality of leather panels and disposed on the outside of the ball body. The plurality of leather panels each have a main body and an extending portion that is thinner than the main body and extends from a front-side portion of an outer end surface of the main body to configure an outer end surface of the leather panel. The extending portions of adjacent leather panels are bonded to each other with an adhesive and stitched together with a stitching thread. The extending portion is provided with a reinforcing member for reinforcing an area thereof stitched with the stitching thread.

A method for manufacturing a ball for ball games according to one aspect of the present invention is a method for manufacturing a ball for ball games that has a ball body and a spherical shell-shaped outer layer having a plurality of leather panels and disposed on the outside of the ball body, the method having: a leather panel formation step of obtaining each of the leather panels by forming, in a member for leather panel, a main body and an extending portion reinforced with a reinforcing member; an application step of applying an adhesive to an outer surface of each of the extending portions; a joining step of joining the outer surfaces of the extending portions of two leather panels to which the adhesive is applied; a stitching step of stitching together, with a stitching thread, the extending portions of the leather panels, the outer surfaces of which have been joined to each other; and an insertion step of inserting the ball body into a spherical shell body that is obtained by repeating the joining step and the stitching step, to obtain a ball.

DESCRIPTION OF EMBODIMENTS

Embodiments for implementing the present invention are described hereinafter in detail with reference to the drawings.

Figure 1:
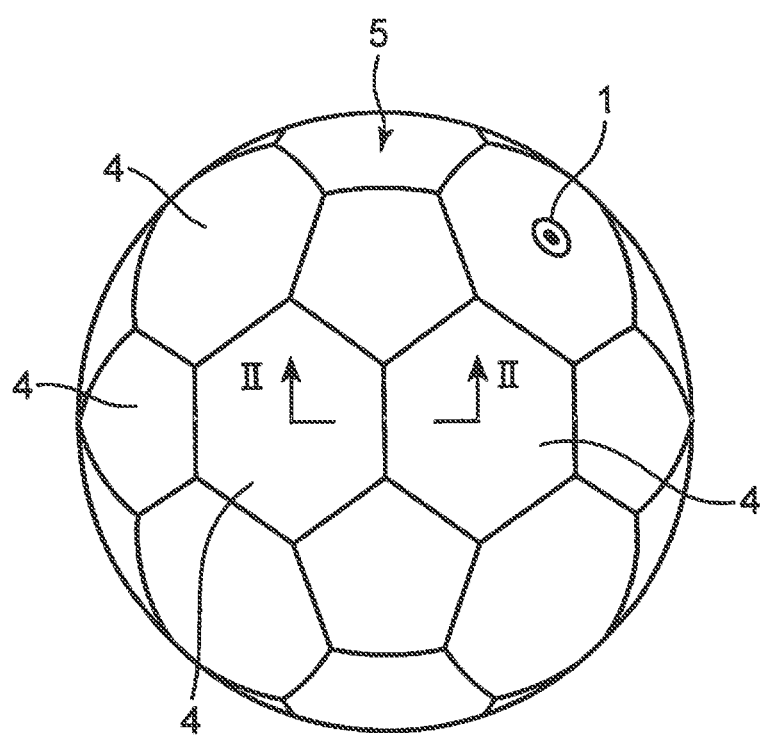
FIG. 1 is a diagram showing the appearance of a ball for ball games according to an embodiment of the present invention.

FIG. 1 shows the appearance of a soccer ball as an embodiment of a ball for ball games according to the present invention. This soccer ball has an outer layer 5 having a plurality of leather panels 4, 4 . . . . Pentagonal panels (twelve) and hexagonal panels (twenty) are used as the leather panels 4, 4 . . . . Only twelve pentagonal panels may be used to configure the leather panels 4, 4 . . . . The spherical surface may be covered with the plurality of panels 4, 4 . . . of a different shape. One of the leather panels 4 is provided with a hole 1 for a valve that is used for putting air into the soccer ball.

Figure 2:
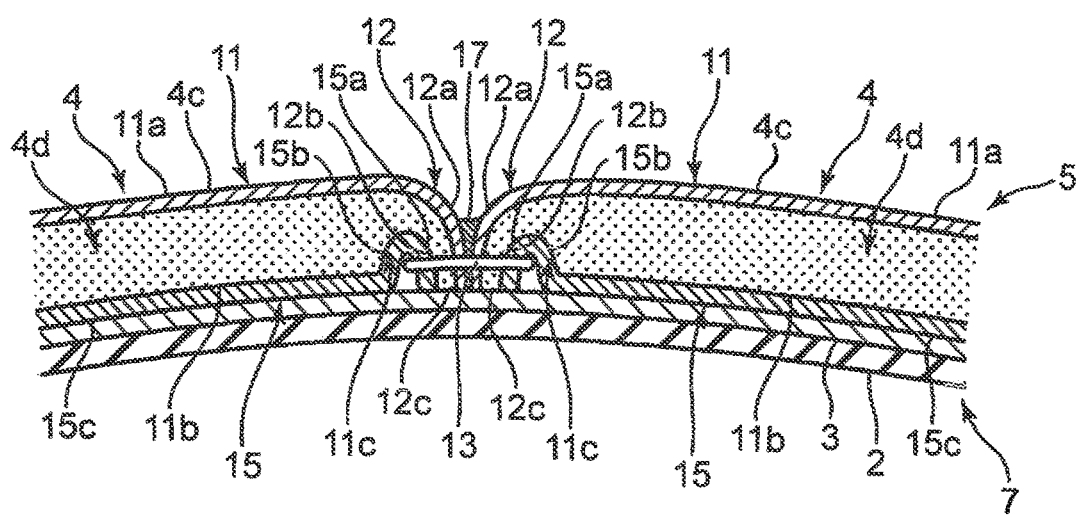
FIG. 2 is a cross-sectional diagram taken along line II-II of FIG. 1.

The soccer ball has a ball body 7 disposed on the inside of the outer layer 5, as shown in FIG. 2. Specifically, the soccer ball has the ball body 7 and the outer layer 5 disposed on the outside of the ball body 7. The ball body 7 has a hollow-shaped bladder 2 and a reinforcing layer 3 provided on the outside of the bladder 2. The bladder 2 is configured into a hollow by an air-impervious rubber such as a butyl rubber or a latex rubber. Compressed air is introduced into the bladder 2.

The reinforcing layer 3 is a layer provided for the purpose of realizing stable quality of a ball, and is formed by winding several thousand meters of a fiber, such as nylon filament, in various directions. The presence of the reinforcing layer 3 can improve the degree of sphericity, durability, outer diameter, form maintainability, and the like.

Note that the reinforcing layer 3 is not limited to the foregoing configuration. For example, the reinforcing layer 3 may be configured by pasting woven fabrics such as a cotton fabric. The reinforcing layer 3 may also be formed by stitching a plurality of woven fabrics into a spherical shape. The reinforcing layer 3 can be omitted in case of creating, for example, a ball for an infant. The body 7 can be configured with an elastomer material capable of providing the reinforcement effect and the bladder effect (air retention function+rebound function).

The outer layer 5 is disposed on the outside of the reinforcing layer 3. Due to this configuration, a rear surface of each of the leather panels 4, 4 . . . configuring the outer layer 5 faces the reinforcing layer 3 (the ball body 7). The leather panels 4, 4 . . . are not bonded to the reinforcing layer 3.

As shown in FIG. 2, a leather panel 4 has a leather material 4c and a rear surface member 4d pasted to the rear side of the leather material 4c. Artificial leather, synthetic leather, or the like is used as the leather material 4c. The rear surface member 4d of the leather panel 4 is configured with a soft, elastic material such as an EVA foam material. The rear surface member 4d functions as a buffer member as well. The leather panel 4 has a thickness of approximately 3 to 8 mm.

Each leather panel 4 has a main body 11 and an extending portion 12 that is thinner than the main body 11 and extends from a side surface of the main body 11. The main body 11 has a slightly smaller outer shape than the leather panel 4 (e.g., polygonal shape, such as a pentagonal shape) but has an outer shape similar to that of the leather panel 4. As shown in FIG. 2, the main body 11 has an even thickness throughout and has a rectangular vertical cross section. The main body 11, therefore, has a front-side surface 11a configured by the leather material 4c, a rear-side surface 11b, opposite to the front-side surface 11a, to which a reinforcing member 15 described hereinafter is secured, and an outer end surface 11c connected to an outer circumferential portion of the rear-side surface 11b.

The extending portion 12 is provided around the main body 11. The extending portion 12 has a front-side surface 12a connected to the front-side surface 11a of the main body 11, an inner side surface 12b connected to the outer end surface 11c of the main body 11, and a leading end surface 12c configuring an outer circumferential surface of the extending portion 12. The extending portion 12 protrudes laterally (toward the outer end surface) from the front side of the outer end surface 11c of the main body 11 and extends toward the rear side. In other words, the extending portion 12 is bent to the rear side.

The length by which the extending portion 12 extends from the main body 11 is approximately equal to the thickness of the main body 11. The leading end surface 12c of the extending portion 12 faces the ball body 7 at a position substantially flush with a rear-side surface 11b of the main body 11. Therefore, the extending portion 12 abuts with the ball body 7, preventing a peripheral portion of the main body 11 from lifting from the ball body 7 and an outer circumferential portion of the leather panel 4 from bulging.

The outer end surface 11c of the main body 11 is configured in such a manner that the back (rear-side portion) of the area where the extending portion 12 is formed (front-side portion) remains in the form of an end surface. The inner side surface 12b of the extending portion 12 faces the rear-side portion of the outer end surface 11c of the main body 11. The front-side surface 12a of the extending portion 12 is formed with the leather material 4c.

The leather material 4c extends from the front-side surface 11a of the main body 11 through the front-side surface 12a of the extending portion 12. That is, the leather material 4c is provided from a front-side surface through an outer end surface of the leather panel 4. Therefore, an outer circumferential portion of the leather material 4c is curved to the rear side.

The rear surface member 4d is provided on the inside so as to be surrounded with the leather material 4c, and configures a range extending through the main body 11 to the extending portion 12 in the leather panel 4. In other words, the main body 11 has the leather material 4c and the rear surface member 4d, and the extending portion 12, too, has the leather material 4c and the rear surface member 4d.

The soccer ball according to the present embodiment is a so-called machine sewing ball in which adjacent leather panels 4 are stitched together with a stitching thread 13.

The soccer ball according to the present embodiment is provided with the reinforcing member 15 for reinforcing the parts stitched with the stitching thread 13.

The reinforcing member 15 is configured with one or more fabrics. The reinforcing member 15 is configured with, for example, cotton, a mixed fabric of cotton and polyester, a nylon fabric, or a polyester fabric. The tensile strength of the reinforcing member 15 is preferably 0.08 to 2.5 kgf/inch (0.31 to 9.6 N/cm) in both the vertical direction and the horizontal direction.

The area density of the reinforcing member 15 (weight per unit area) is preferably 25 to 200 g/m$^2$. Every ball has its optimum weight range for adequately realizing the desired performance when used in ball games. For instance, as to the soccer balls used in the international games, the weight of a size 5 ball is extremely narrow, falling in the range of 420 to 445 g, as regulated by FIFA. This means nothing but the fact that a small weight difference of ±10 g has significant impact on the ball games. In order to make the balls of this size, normally a weight of 80 g to 100 g is used for a bladder, a weight of 100 g to 120 g for a reinforcing layer, and hence the remaining weight of 200 to 240 g for the leather panels 4, 4 . . . . The weight of the leather materials 4c, 4c . . . of the leather panels 4, 4 . . . needs to be approximately 120 to 150 g. In the leather panels 4, 4 . . . , therefore, the remaining weight that can be applied to the members other than the leather materials 4c, 4c . . . is 50 to 120 g. Because the weight of the stitching thread 13 used in the present embodiment needs to be 10 g, the weight of the other members of the leather panels 4, 4 . . . , which are the rear surface members 4d, 4d . . . , the reinforcing members 15, 15 . . . and an adhesive 17 is 40 to 110 g. Because the rear surface members 4d, 4d . . . are used as buffer materials for absorbing impacts, it is preferred that the rear surface members 4d, 4d . . . provide as much weight as possible and thus weigh 35 to 70 g. Therefore, the weight of the reinforcing members 15, 15 . . . is 5 to 40 g. It is not easy to accomplish objectives under such weight regulations. The weight 5 to 40 g corresponds to the weight of a single ball; thus, when configuring a reinforcing member 15 with a woven fabric, the area density of the reinforcing member 15 becomes 25 to 200 g/m$^2$. Consequently, the weights of the materials that can be used for the reinforcing member 15 need to fall within the foregoing range. If the materials for the reinforcing member 15 weigh 200 g/m$^2$ or more, the panels become heavy, bringing about the need to reduce the weights of the other members, and resulting in inability to keep sufficient quality of the ball.

The reinforcing member 15 is provided on the rear side of the rear surface member 4d. Specifically, the reinforcing member 15 has, integrally, a first section 15a secured to the inner side surface 12b of the rear surface member 4d in the extending portion 12, a second section 15b secured to the outer end surface 11c of the rear surface member 4d in the main body 11, and a third section 15c secured to the rear-side surface 11b of the rear surface member 4d in the main body 11.

The first section 15a is configured by an outer circumferential portion of the reinforcing member 15 and disposed along the inner side surface 12b of the extending portion 12. An outer end surface of the first section 15a is disposed flush with the leading end surface 12c of the extending portion 12 and faces the ball body 7. The reinforcement effect of the stitched portion between the extending portions 12 is achieved mainly by the first section 15a. In other words, without the first section 15a, the stitches on the rear surface member 4d made of a soft material tear easily, and cause stitch-skipping. Consequently, the strength for withstanding use of the ball cannot be achieved.

The second section 15b is connected to the first section 15a by folding back from the first section 15a, and is disposed along the outer end surface 11c of the main body 11. Because the second section 15b is curved in such a manner as to fold back from the first section 15a, a groove is formed on the rear surface of the leather panel 4. This groove extends along the outer circumference of the leather panel 4 and is connected in the form of a ring.

The third section 15c is provided over the entire rear surface of the rear surface member 4d in the main body 11. The third section 15c is in contact with the reinforcing layer 3 in the ball body 7. However, the reinforcing member 15 is not bonded to the reinforcing layer 3 with adhesive but is present independently from the reinforcing layer 3.

Because the reinforcing member 15 is provided over the entire leather panel 4, the reinforcing member 15 functions to reinforcing the entire ball along with the reinforcing layer 3. In other words, since the reinforcing member 15 is configured to have integrally the first section 15a, the second section 15b, and the third section 15c, the reinforcing member 15 not only functions to reinforce the stitched portion between the extending portions 12 but also functions to reinforce the entire ball. Because the reinforcing member 15 is present independently from the reinforcing layer 3 of the ball body 7, a member that is thinner than that of a conventional machine-sewn ball can be employed as the reinforcing layer 3.

Note that the reinforcing member 15 may be configured without the third section 15c or may be configured without the second section 15b and third section 15c. According to such configurations, the weight of the entire ball can be reduced more than when the reinforcing member 15 has the first section 15a, the second section 15b, and the third section 15c.

Figure 3:
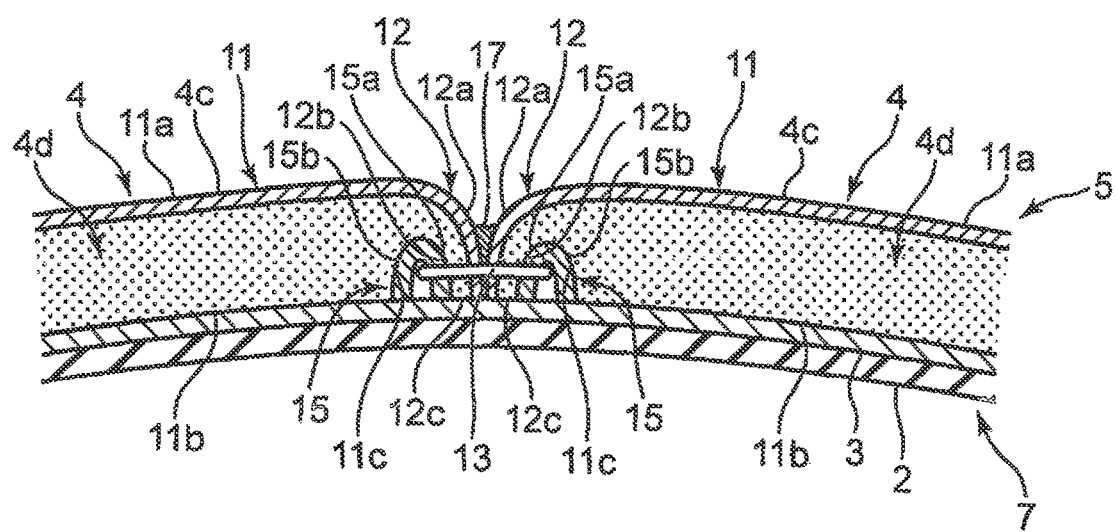
FIG. 3 is a diagram equivalent to FIG. 2, according to another embodiment of the present invention.

In the configuration in which the reinforcing member 15 has the first section 15a and the second section 15b but does not have the third section 15c, the rear-side surface 11b of the main body 11 faces the ball body 7 (the reinforcing layer 3), as shown in FIG. 3. In this case, the reinforcing member 15 that is shaped into a tape and has a width corresponding to the width of the inner side surface 12b of the extending portion 12 and the width of the outer end surface 11c of the main body 11 is used.

The adjacent leather panels 4, 4 are stitched together with the stitching thread 13. In other words, the leather material 4c, the rear surface member 4d and the reinforcing member 15 of one of the leather panels 4 are stitched to the leather material 4c, the rear surface member 4d and the reinforcing member 15 of the adjacent leather panel 4, with the stitching thread 13.

The yarn count of the stitching thread 13 is preferably 15 to 40 and more preferably 20 to 30.

The adjacent leather panels 4, 4 are bonded to each other with the adhesive 17. The groove between the outer end surfaces of the leather panels 4 is filled with the adhesive 17, forming a V-shaped groove between the leather panels 4, 4 on the front side of the adhesive 17 (the upper side of FIG. 2). Note that the adhesive 17 is applied not only to the groove between the outer end surfaces of the leather panels 4 but also to the leading end surface 12c of the extending portion 12 of each panel 4.

The adhesive 17 covers the stitched portion including the stitching holes formed by the stitching thread 13. In other words, the stitching thread 13 penetrates a layer configured by the adhesive 17. For this reason, the stitching thread 13 cannot be seen from the outside. Due to the presence of the adhesive 17 around the stitching holes, the stitching holes on the leather material 4c are closed with the adhesive 17, preventing water from seeping into the ball.

The adhesive 17 is made of a heat active type adhesive 17. Specifically, the adhesive 17 applied to each of the extending portions 12 of the leather panels 4 is dried and solidified at room temperature. The adhesive that is solidified on each of the extending portions 12 melts and becomes fused by being heated at, for example, approximately 45 to 65° C. Thereafter, the adhesive 17 on the extending portions 12 is bonded together and eventually solidified. The melted adhesive 17 flows into the stitching holes to close the stitching holes, further reinforcing the effect of preventing absorption of water into the ball.

Figure 4:
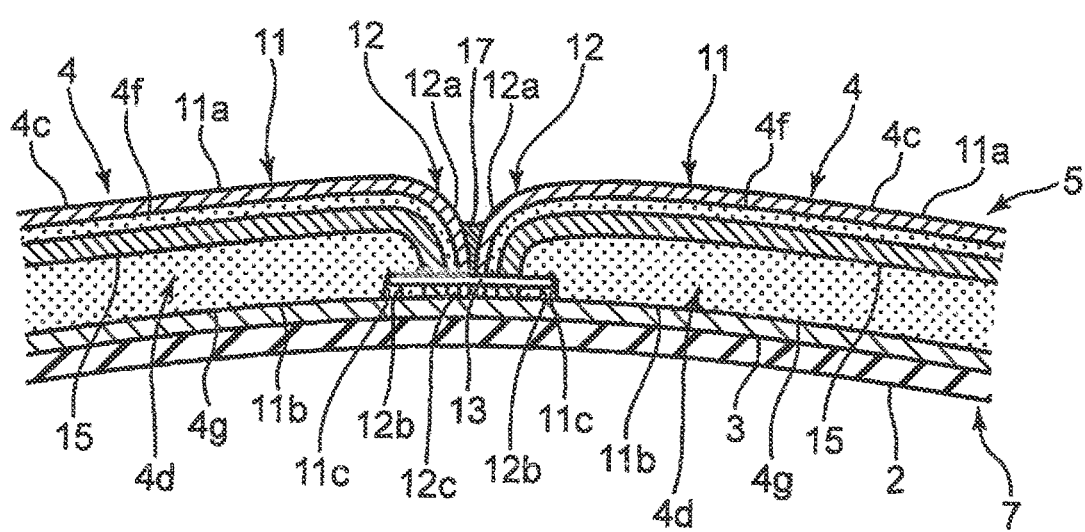
FIG. 4 is a diagram equivalent to FIG. 2, according to yet another embodiment of the present invention.

The reinforcing member 15 is provided in the rear surface member 4d, as shown in FIG. 4. In this case, the rear surface member 4d consists of a front-side portion 4f located on the leather material 4c side of the reinforcing member 15 and a rear-side portion 4g located on the opposite side to the leather material 4c with respect to the reinforcing member 15. Specifically, the reinforcing member 15 is sandwiched between the front-side portion 4f and the rear-side portion 4g. The presence of the front-side portion 4f on the leather material 4c side of the reinforcing member 15 can prevent deterioration of the ball texture.

In this case as well, the reinforcing member 15 is provided over the range extending through the main body 11 to the extending portion 12. The reinforcing member 15 has the area disposed on the inside of the extending portion 12 and the area disposed on the inside of the main body 11, and has an outer circumferential area curved, as with the leather material 4c.

A method for manufacturing the soccer ball according to the present embodiment is now described.

First, a step of forming the leather panel 4 is described. This leather panel formation step entails forming a member for leather panel 19 having a shape corresponding to the shape of the leather panel 4 and forming the leather panel 4 from the member for leather panel 19. This step includes a pasting step, a cutting step, and an extending portion formation step.

Figure 5:
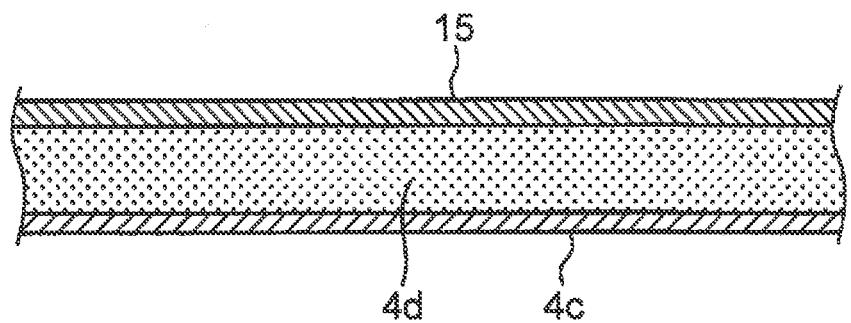
FIG. 5 is a diagram for explaining a pasting step.

In the pasting step, the rear surface member 4d and the reinforcing member 15 are attached to the rear side of the leather material 4c as shown in FIG. 5. Natural latex can be used as an adhesive. The leather material 4c and the rear surface member 4d may be secured to each other with the adhesive. The rear surface member 4d and the reinforcing member 15 may also be secured to each other by the adhesive. At this stage, the leather material 4c, the rear surface member 4d, and the reinforcing member 15 are not yet cut, and therefore are not in the shape corresponding to the shape of the leather panel 4. FIG. 5 shows a case of the soccer ball shown in FIG. 2. The rear surface member 4d is attached to the rear side of the leather material 4c and the reinforcing member 15 is attached to the rear side of the rear surface member 4d. In the soccer ball shown in FIG. 4, the reinforcing member 15 is attached between the front-side portion 4f and rear-side portion 4g of the rear surface member 4d. All the rest are the same.

Figure 6:
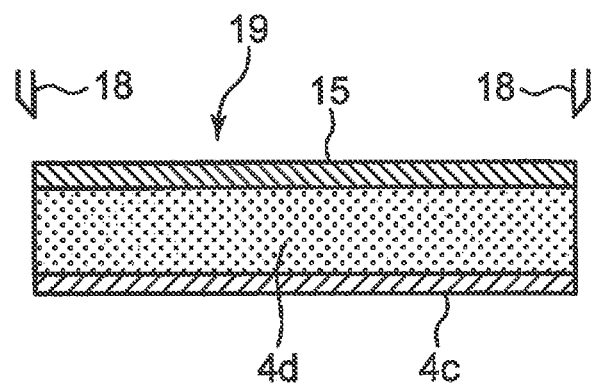
FIG. 6 is a diagram for explaining a cutting step.

As shown in FIG. 6, in the cutting step, the leather material 4c, the rear surface member 4d, and the reinforcing member 15 are cut altogether into the shape corresponding to the shape of the leather panel, to obtain the member for leather panel 19. In order to cut these members, these members may be cut by cutting die 18 or cut out using a cutter, not shown.

Figure 7:
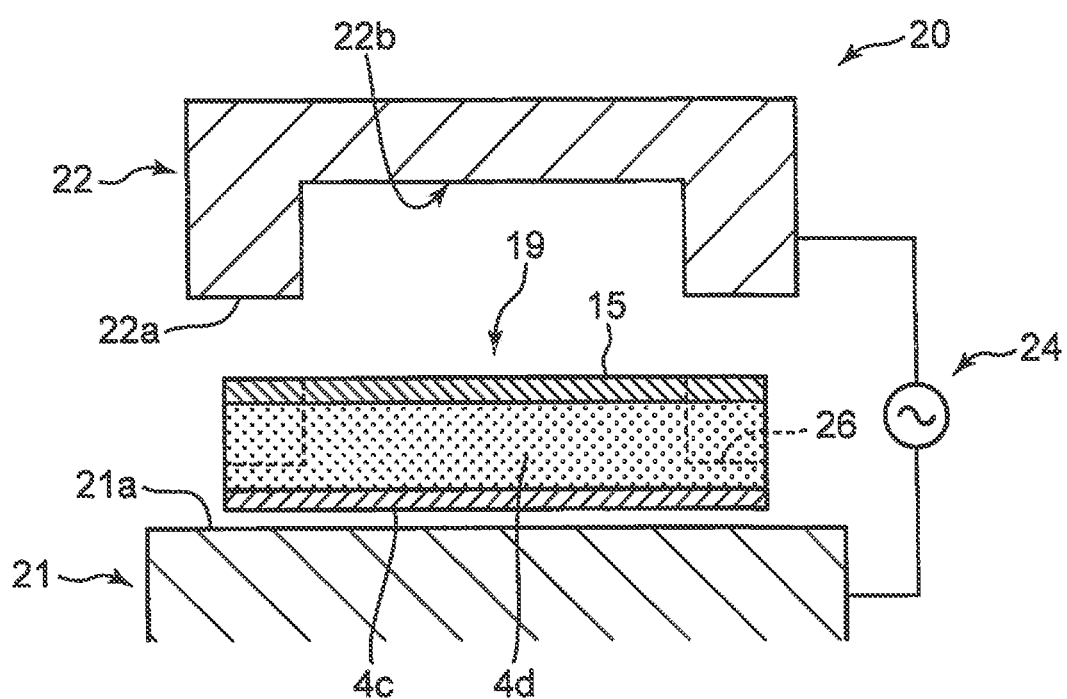
FIG. 7 is a diagram for explaining an extending portion formation step.

In the extending portion formation step, the leather panel 4 in which the main body 11 and the extending portion 12 are formed is obtained by denting an outer circumferential portion of the member for leather panel 19. In the extending portion formation step, a depressed portion forming apparatus 20 is used, as shown in FIG. 7. This depressed portion forming apparatus 20 has a first die 21, a second die 22, and a temperature-raising portion 24 for raising the temperature of the outer circumferential portion of the member for leather panel 19.

The first die 21 has a flat portion 21a for pressing a front-side surface of the member for leather panel 19. The second die 22, on the other hand, is provided with an annular projection 22a for forming a depressed portion 26 on the outer circumferential portion of the member for leather panel 19. The vertical cross section of this annular projection 22a is formed into, for example, a rectangle, and a depressed portion 22b surrounded by the annular projection 22a has the size and shape (similar shape) corresponding to the main body 11 of the leather panel 4.

The temperature-raising portion 24 is configured with a high frequency generator or an ultrasonic generator. In case of a high frequency generator, the temperature-raising portion 24 is configured to apply a high-frequency voltage (e.g., 10 kHz, voltage of several thousand volts) between the first die 21 and the second die 22 taken as electrodes. Then, a peripheral portion of the member for leather panel 19 is compressed with the first die 21 and the annular projection 22a of the second die 22. In so doing, a member for leather panel 19 is set in such a manner that the leather material 4c is located on the first die 21 side and the reinforcing member 15 on the annular projection 22a side. A high-frequency voltage can be applied between the electrodes until the temperature becomes equal to or higher than a temperature at which the rear surface member 4d melts at the position corresponding to the annular projection 22a.

Figure 8:
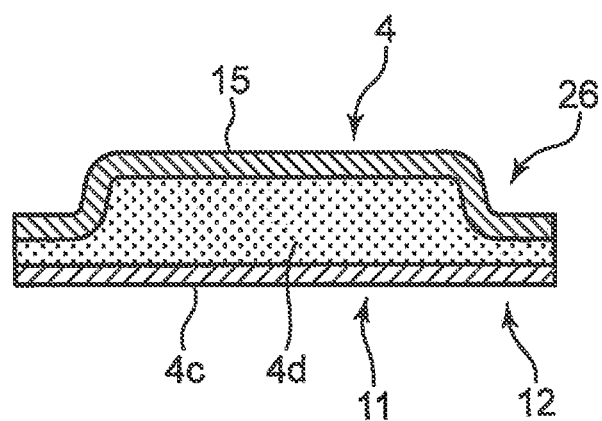
FIG. 8 is a diagram showing a leather panel after an extending portion is formed.

Once the temperature of the outer circumferential portion of the member for leather panel 19 increases, an outer circumferential portion of the rear surface member 4d that corresponds to the area between the annular projection 22a and the flat portion 21a melts and becomes compressed. As a result, the depressed portion 26 that is dented on the reinforcing member 15 side is formed in the outer circumferential portion of the rear surface member 4d. At this moment, the reinforcing member 15 becomes deformed without being melted, in response to the melting and compression of the rear surface member 4d (see FIG. 8). As a result, the leather panel 4 in which the main body 11 and the extending portion 12 are formed can be obtained. The depressed portion 26 is formed into a thickness that allows the extending portion 12 to be folded. At this moment, however, the extending portion 12 is not yet folded and extends laterally and straight from the main body 11 into the shape of a flange.

When manufacturing the soccer ball shown in FIG. 4, the temperature-raising portion 24 is not limited to the configuration of raising the temperature of the peripheral portion of the member for leather panel 19 at a high-frequency voltage. The temperature-raising portion 24 may be configured with, for example, a heater, not shown, which is embedded in the second die 22. The member for leather panel 19 is heated by increasing the temperature of the annular projection 22a with the heat of the heater.

Figure 9:
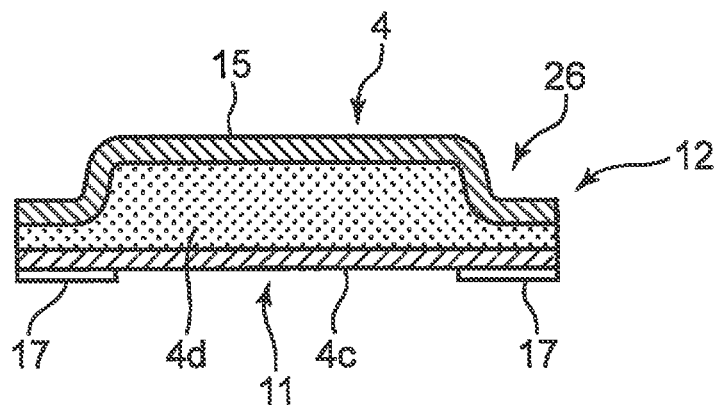
FIG. 9 is a diagram for explaining an application step.

Subsequently, the adhesive 17 is applied to an outer surface of the extending portion 12 in the leather panel 4 (the application step). As show in FIG. 9, in the application step, the adhesive 17 is applied to the area that eventually forms the outer end surface of the leather panel 4 when the extending portion 12 is bent. The adhesive 17 is made of a heat active type adhesive. The adhesive 17 is dry and solid but melts when heated.

Figure 10:
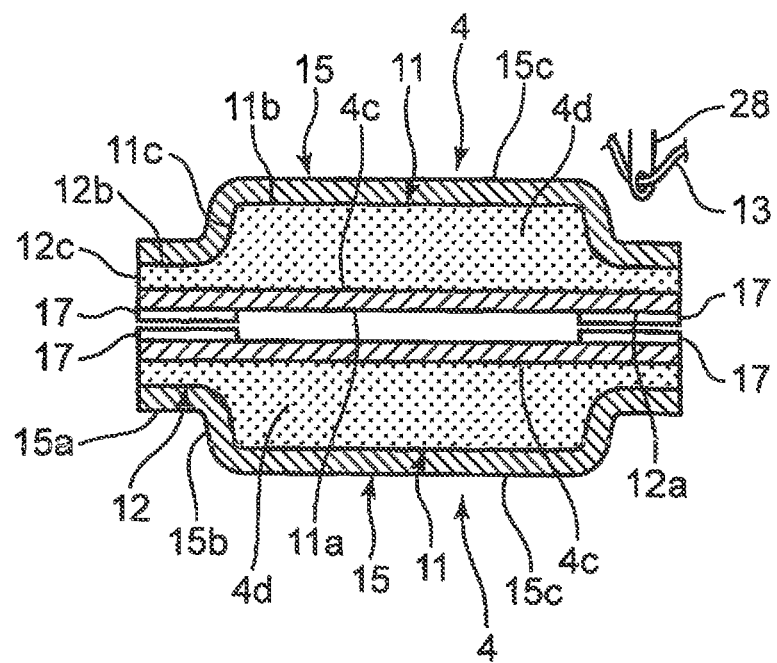
FIG. 10 is a diagram for explaining a joining step.

Next, the outer surfaces of two leather panels 4 are brought into contact with each other, as shown in FIG. 10 (the joining step). In so doing, because the adhesive 17 is already applied to the outer circumferential portions of the outer surfaces of the leather panels, the areas applied with the adhesive 17 face each other.

Figure 11:
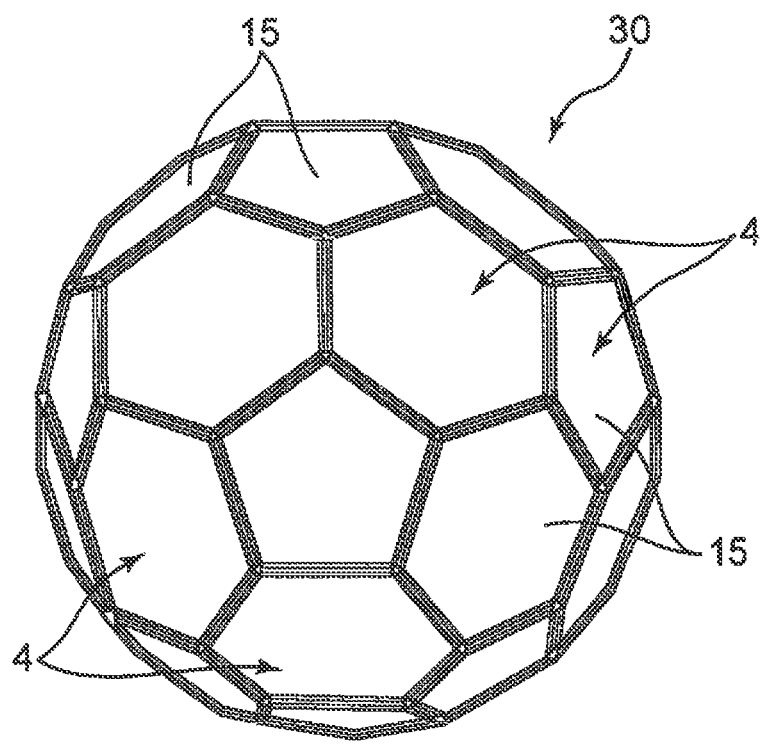
FIG. 11 is an external view of a spherical shell body.

Thereafter, the extending portions 12 of the leather panels 4, the outer surfaces of which have been joined to each other, are stitched together with the stitching thread 13 (the stitching step). In the stitching step, a sewing machine needle 28 with the stitching thread 13 is passed through the reinforcing member 15, the rear surface members 4*d*, and the leather materials 4*c* of the both leather panels 4, to stitch these members together. Then, the joining step and the stitching step are repeated to form a spherical shell body 30 (see FIG. 11). In so doing, sides that are not stitched are ensured to create an opening into which the ball body 7 is inserted.

Figure 12:
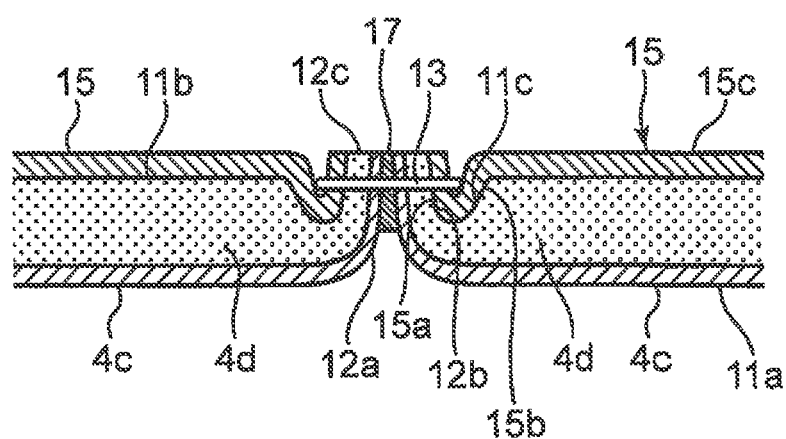
FIG. 12 is a diagram showing a stitched portion between two leather panels of the spherical shell body.

In this spherical shell body 30, the reinforcing members 15 are located on the front side and the extending portions 12 are folded to the front side, as shown in FIG. 12. Thus, the spherical shell body 30 is turned over using the above-mentioned opening. The ball body 7 is inserted into the spherical shell body 30 and the opening is stitched and closed, forming a ball (the insertion step).

Figure 13:
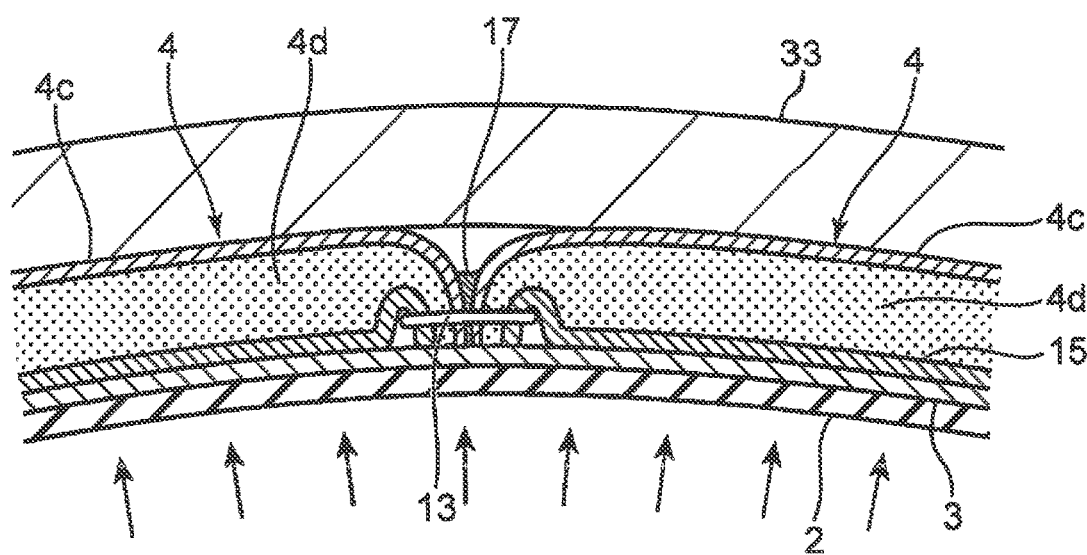
FIG. 13 is a diagram for explaining a solidification step.

Next, as shown in FIG. 13, the ball is inserted into a mold 33, high-pressure air (6 to 8 kg/cm$^2$) is injected into the bladder 2 with the mold 33 closed, and the mold 33 is pressurized and heated. As a result, the adhesive 17 on each extending portion 12 melts once and becomes bonded (fused) and thereafter solidified (the fusing and solidification step). Specifically, the mold 33 is heated to a temperature at which the adhesive 17 shows activity, and thereafter the ball is cooled, thereby bonding the adjacent leather panels 4 to each other. As a result, the soccer ball is completed. Also as shown in FIG. 13, the arrangement of the top surface of the adhesive 17 together with the opposite front-side surfaces of the extending portions 12 define a dimple space therebetween According to the present embodiment described above, the areas of the extending portions 12 of the adjacent leather panels 4 that are stitched with the stitching thread 13 are reinforced by the reinforcing member 15. Therefore, seam tear and stitch-skipping are not likely to occur between the extending portions 12 of the leather panels 4. Moreover, the extending portions 12 of the adjacent leather panels 4 are bonded to each other with the adhesive 17, thus keeping the front-side surfaces of the extending portions 12 from coming into direct contact with each other as shown in FIG. 13. For this reason, it is unlikely that the stitching thread 13 be exposed when the soccer ball is in use. Even when force acts on the ball to split the adjacent leather panels 4, 4 apart, tension acting on the stitching thread 13 is reduced because the tight adhesion between the extending portions 12 is kept by the adhesive 17. Therefore, the stitching thread 13 is not torn easily. In addition, the space between the panels 4 is covered with the adhesive 17 and the stitching holes are securely closed with the melted adhesive 17, preventing water from seeping through the stitching holes. Furthermore, because the extending portion 12 is made thinner than the main body 11, the presence of the extending portion 12 prevents the outer circumferential portion of the leather panel 4 from bulging. In other words, in a conventional stitched ball in which the outer circumferential portion having the same thickness as the main body is folded inward, the outer circumferential portion of each leather panel comes into contact with the ball body and the peripheral portion of the main body lifts from the ball body to cause the outer circumferential portion of each leather panel to bulge toward the front side. In the soccer ball according to the present embodiment, on the other hand, such a phenomenon does not occur because the extending portion 12 is made thinner than the main body 11.

Next is described the effect of reinforcing the stitched portion between the leather panels 4, the effect being accomplished not only by the configuration in which the leather panels 4 are stitched together with the stitching thread 13 and the end surfaces of the leather panels 4 are bonded to each other by the adhesive 17, but also by providing the reinforcing member 15 on the rear side of each leather panel 4.

For the purpose of enhancing the adhesive effect (adhesive strength) of the adhesive 17, it is essential to press (apply pressure to) the leather panels 4 to be bonded. The configuration in which the end surfaces of the panels are simply bonded to each other, unfortunately, cannot generate force that presses the end surfaces against each other. Thus, application of pressure to the bonded surfaces of the leather panels 4 is realized by sewing the end surfaces of the both panels 4 together, with the reinforcing members 15 interposed therein. Compared to not sewing the end surfaces, sewing the end surfaces can increase the adhesive strength.

This aspect is now described in more detail. Since the rear surface member 4*d* is a buffer material, the entire stitching thread 13 is buried in the rear surface member 4*d* when the reinforcing member 15 is not provided. Therefore, in spite of the configuration of stitching the leather panels 4 together with the stitching thread 13, if the reinforcing member 15 is not provided, the force of pressurizing the bonded surfaces of the leather panels 4 becomes weak. On the other hand, if the reinforcing member 15 is provided, the stitching thread 13 acts between stitching holes to press the rear surface member 4*d* via the reinforcing member 15, and thus acts to press the bonded surfaces of the leather panels 4 without having the sewing force absorbed by the rear surface member 4*d*. Specifically, the tensile force of the stitching thread 13 only acts on the part where the stitching thread 13 is in contact with the leather panels 4, if the leather panels 4 are simply stitched together but are not bonded to each other. Consequently, the leather panels 4 cannot be pressed in a wide area thereof. Moreover, without the reinforcing member 15, the bonded surfaces of the leather panels 4 cannot be pressed effectively by the tension of the stitching thread 13. Also, when a heat active type adhesive is used, the adhesive that is applied to and melted on both of the end surfaces of the leather panels 4 becomes mixed up and pressurized by the pressure obtained by sewing the end surfaces. Consequently, the adhesive strength of the heat active type adhesive increases. By stitching and bonding the leather panels 4 to each other and incorporating the reinforcing member 15, the durability of the panels 4 (the outer layer 5) can be improved due to these synergetic effects.

In the present embodiment, the reinforcing member 15 is provided over the range extending from the extending portion 12 through the main body 11. The reinforcing member 15 not only reinforces the stitched portion between the extending portions 12 but also provides the reinforcement effect of the leather panels 4. The use of the reinforcing member 15 of the size equivalent to the range between the extending portion 12 and the main body 11 can prevent complexification of the process of attaching the reinforcing member 15 to the member for leather panel 19. In other words, the process of attaching the reinforcing member can be made simpler than that of attaching the reinforcing member 15 to the main body 11 and the extending portion 12 separately. Positional displacement of the reinforcing member 15 can be prevented as well.

In the present embodiment, the reinforcing member 15 is provided over a range including the rear-side surface 11b of the main body 11 that faces the ball body 7, the rear-side portion of the outer end surface 11c of the main body 11, and the inner side surface 12b of the extending portion 12 that faces the outer end surface 11c of the main body 11. Specifically, the reinforcing member 15 is provided on the inner side surface 12b of the extending portion 12 that faces the outer end surface 11c of the main body 11. For this reason, seam tear and stitch-skipping are not likely to occur in the extending portion 12 of the leather panel 4. The presence of the rear surface member 4d between the reinforcing member 15 and the leather material 4c can provide a feature of a ball for ball games, such as being soft to the touch. Since the reinforcing member 15 is also provided on the rear-side surface 11b of the main body 11 that faces the ball body 7, the reinforcing member 15 functions to reinforce the ball.

Even in the configuration in which the reinforcing member 15 is provided on the inside of the rear surface member 4d as shown in FIG. 4, seam tear and stitch-skipping are not likely to occur. Furthermore, by heating the rear surface member 4d or increasing the temperature by applying high-frequency voltage to the rear surface member 4d, the depressed portion 26 can be formed in the peripheral portion of the rear surface member 4d.

In the present embodiment, the adhesive 17 is a heat active type adhesive. The adhesive 17 therefore can be applied to the outer circumferential portion of the outer surface of each leather panel 4 prior to stitching the extending portions 12 of the leather panels together. Specifically, after the adhesive 17 that is applied to the outer circumferential portion of the outer surface of each leather panel 4 is dried, the extending portions 12 of the leather panels 4 can be stitched together. Therefore, compared to when injecting the adhesive between the leather panels 4, 4 after stitching the leather panels 4 together, the time it takes to create the outer layer 5 can be reduced more. The adhesive 17 is heated, with the adjacent leather panels 4, 4 being stitched together with the stitching thread 13, completing adhesion of the leather panels 4, 4. Because the adjacent leather panels 4, 4 are bonded to each other while being pressed by the stitching thread 13, the adhesive molecules applied to the panels 4, 4 melt (mutual melting) and become bonded to each other. Consequently, high adhesive strength can be obtained. When injecting the adhesive between the leather panels 4, 4 after stitching the leather panels 4, 4 together, mutual melting does not take place and the adhesive strength is weak due to the absence of the pressure force.

In the manufacturing method according to the present embodiment, the outer surfaces of the extending portions 12 to which the adhesive 17 is applied are joined to each other and the extending portions 12 are stitched together with the stitching thread 13. This procedure reduces the manufacturing time more compared to when injecting the adhesive between the adjacent leather panels 4, 4 after stitching the leather panels 4, 4 together. Forming the reinforcing member 15 in each of the extending portions 12 to be stitched together prevents the occurrence of seam tear and stitch-skipping during the stitching step.

In the manufacturing method according to the present embodiment, the reinforcing member 15 is attached to the rear surface member 4d, and thereafter the leather material 4c, the rear surface member 4d, and the reinforcing member 15 are cut altogether into a shape corresponding to the shape of the leather panels. Therefore, compared to when attaching to the rear surface member 4d the reinforcing member 15 that is cut into the shape of the leather panels, the burden involved in the process of attaching the reinforcing member 15 can be alleviated more. Specifically, because the reinforcing member 15 is not yet cut at the time of attaching the reinforcing member 15, precise positioning of the reinforcing member 15 is not necessary. This reduces the burden involved in the attaching process. Moreover, positional displacement of the reinforcing member 15 can be prevented. Because the extending portion 12 is formed after the rear surface member 4d is attached to the rear side of the leather material 4c and cut, positional displacement of the rear surface member 4d itself can be prevented as well. In other words, in a case where the extending portion is formed by cutting the leather material and then attaching the cut rear surface member thereto, there is a possibility that positional displacement of the rear surface member might occur, causing differences in length of the extending portion. This leads to a fluctuation in the shape of the leather panels when the extending portion is bent, deteriorating the aesthetic aspect of the ball for ball games. On the other hand, in a case where the reinforcing member 15 is attached to the rear surface member 4d and thereafter the leather material 4c, the rear surface member 4d, and the reinforcing member 15 are cut altogether, positional displacement of the rear surface member 4d does not occur, preventing deterioration of the aesthetic aspect of the ball for ball games.

In the manufacturing method according to the present embodiment, the extending portion 12 extending from the main body 11 is formed by denting the outer circumferential portion of the rear surface member 4d to which the reinforcing member 15 is attached. Therefore, the extending portion 12 reinforced with the reinforcing member 15 can be formed easily. In the configuration in which the reinforcing member is attached to the rear surface member after denting the outer circumferential portion of the rear surface member, the process of attaching the reinforcing member is complicated, possibly causing positional displacement of the location for attaching the reinforcing member. However, in attaching the reinforcing member 15 and then denting the outer circumferential portion of the rear surface member 4d that is cut into the shape corresponding to the shape of the leather panels, the burden involved in the work of attaching the reinforcing member 15 can be alleviated, preventing positional displacement of the reinforcing member 15.

In the manufacturing method according to the present embodiment, denting the rear surface member 4d at once can realize easy formation of the extending portion 12. Therefore, the extending portion 12 of uniform width can be realized. In addition, the panels can be sewn together with reference to the boundary between the extending portion 12 and the main body 11 (depressed portion boundary). Consequently, the extending portion 12 that is folded after sewing provides uniform height, improving the aesthetic aspect of the ball. In a conventional method, on the other hand, the absence of a sewing guideline makes the distance from a panel end surface (margin) uneven and thus creates an uneven folded margin after sewing, deteriorating the aesthetic aspect of the ball.

Figure 14:
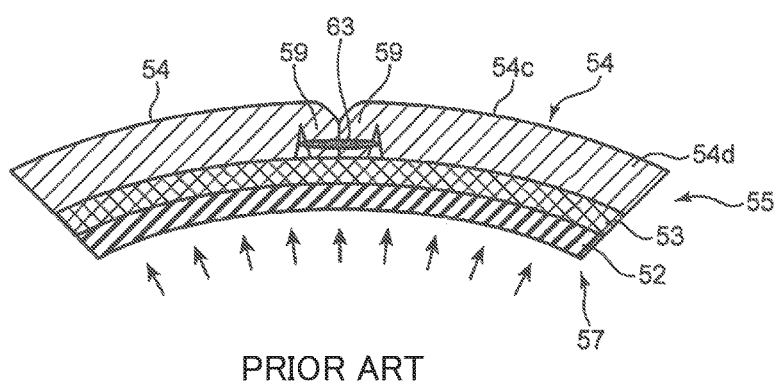
FIG. 14 is a diagram showing a conventional ball for ball games.
Figure 15:
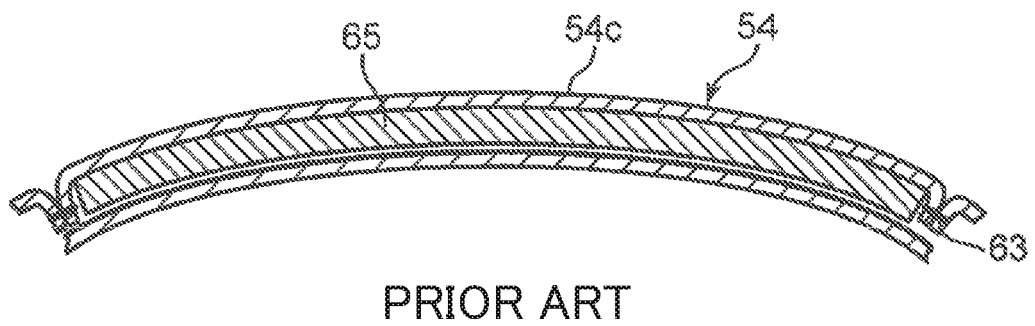
FIG. 15 is a diagram showing a conventional ball for ball games.
Figure 16:
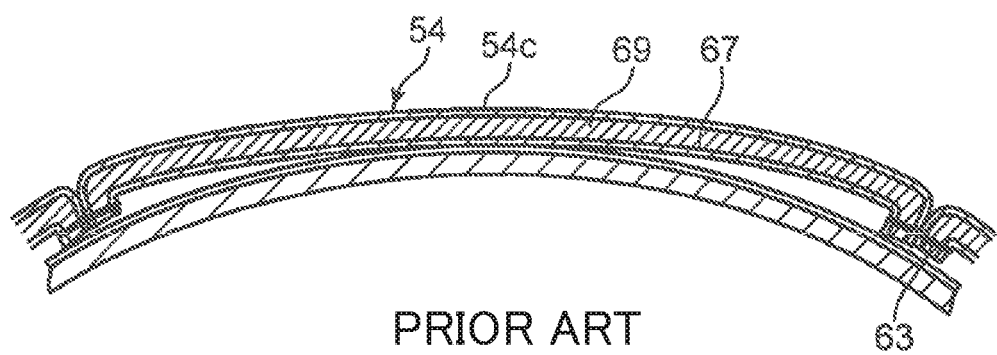
FIG. 16 is a diagram showing a conventional ball for ball games.

In the manufacturing method according to the present embodiment, because the outer circumferential portion of the rear surface member 4d to which the reinforcing member 15 has been attached is melted and then dented, the depressed portion can easily be formed in the outer circumferential portion of the rear surface member 4*d* to which the reinforcing member 15 is attached. Even when melting the rear surface member 4*d*, the reinforcing member 15 does not come off the rear surface member 4*d*. Since the area of the reinforcing member 15 that is pressed by the annular projection 22*a* of the second die 22 and the area of the same that is not pressed by the annular projection 22*a* are clearly bounded, leather panels 4, 4 can be sewn together with reference to this boundary. Specifically, the reinforcing member 15 is made of a woven fabric wherein a surface has irregularities formed by the warp and weft and, in some cases, wrinkles. Although the area of the reinforcing member 15 that is pressed by the annular projection 22*a* can become free of the surface irregularities and become flat, the other areas still have the surface irregularities. The presence/absence of the irregularities on the surface is a cause of visual differences on the surface. As a result, an annular area that has a smooth surface and a constant width is formed in the outer circumferential portion of the reinforcing member 15. Therefore, the panels can be sewn together along the boundary between the area with a smooth surface and the area without, whereby the height of the extending portion 12 is likely to be constant when the extending portion 12 is folded. In the conventional technique shown in FIG. 14, because the folding portion 59 is made of a sponge, the folding portion 59 and the other areas have equally smooth surfaces in spite of the difference in level on these areas. For this reason, the folding portion 59 and the other areas show less visual differences, making boundaries less visible at the time of sewing.

In the manufacturing method according to the present embodiment, the adhesive 17 is dry in the stitching step. Therefore, the adhesive 17 can be prevented from adhering to an unintended area during the process of stitching the extending portions 12. In addition, because the ball body 7 is inserted into the spherical shell body 30 and thereafter the adhesive 17 is melted to completely bond the extending portions 12 to each other, the space between the leather panels 4, 4 can be closed neatly. At this moment, the area between the extending portions 12 that is stitched with the stitching thread 13 can be completely covered by the adhesive 17. The adhesive 17 is heated, with the adjacent leather panels 4, 4 being stitched together with the stitching thread 13, completing adhesion of the adjacent leather panels 4, 4. As a result, the adjacent leather panels 4, 4 are bonded to each other while being pressed by the stitching thread 13, achieving high adhesive force.

It should be noted that the present invention is not limited to the foregoing embodiment, and various changes and improvements can be made without departing from the gist of the present invention. For example, although the foregoing embodiment has described an example in which the present invention is applied to a soccer ball, the present invention can be applied to other types of balls for various ball games, such as valley balls, handballs, basketballs, rugby balls, American footballs, netballs, futsal balls, beach soccer balls, Australian footballs, rugby league footballs, rugby union footballs, and touch balls.

According to the foregoing embodiment, a heat active type adhesive is used as the adhesive 17, but other types of adhesives may be applicable.

The foregoing embodiment is summarized below.

(1) The ball for ball games according to the foregoing embodiment has a ball body and a spherical shell-shaped outer layer having a plurality of leather panels and disposed on the outside of the ball body. The plurality of leather panels each have a main body and an extending portion that is thinner than the main body and extends from a front-side portion of an outer end surface of the main body to configure an outer end surface of the leather panel. The extending portions of adjacent leather panels are bonded to each other with an adhesive and stitched together with a stitching thread. The extending portion is provided with a reinforcing member for reinforcing an area thereof stitched with the stitching thread.

In the ball for ball games according to the foregoing embodiment, the areas of the extending portions of the leather panels that are stitched together by the stitching thread are reinforced by the reinforcing member. Therefore, seam tear and stitch-skipping are not likely to occur in the extending portions of the leather panels. Moreover, the extending portions of the adjacent leather panels are bonded to each other with the adhesive. Therefore, it is unlikely that the stitching thread be exposed when the ball for ball games is in use. Even when force acts on the ball to split the adjacent leather panels apart, the tension acting on the stitching thread can be reduced because the tight adhesion between the extending portions is kept by the adhesive. Consequently, the stitching thread is not torn easily. In addition, the space between the leather panels and the stitching holes are closed securely with the adhesive, preventing water from seeping through the space between the leather panels or the stitching holes. Because the extending portion is made thinner than the main body, the presence of the extending portion or margin prevents the outer circumferential portion of the leather panel from bulging. In other words, in the conventional stitched ball in which the outer circumferential portion having the same thickness as the main body is folded inward, the outer circumferential portion or margin of each leather panel comes into contact with the ball body to lift the peripheral portion of the main body off the ball body, resulting in bulging of the outer circumferential portion or margin of the leather panel to the front side. In the ball for ball games according to the present embodiment, on the other hand, such a phenomenon does not occur because the extending portion is made thinner than the main body.

(2) The main body and the extending portion may each have a leather material and a rear surface member secured to a rear surface of the leather material. In this case, the reinforcing member may be provided over a range including a rear-side portion of the outer end surface of the main body and an inner side surface of the extending portion that faces the rear-side portion of the outer end surface of the main body.

According to this aspect, the extending portions that each has the leather material and the rear surface member are stitched together with the stitching thread. Also, the reinforcing member is provided on the inner side surface of the extending portion that faces the outer end surface of the main body. Therefore, seam tear and stitch-skipping are not likely to occur in the extending portion of each leather panel. The presence of the rear surface member between the reinforcing member and the leather material can provide a feature of a ball for ball games, such as being soft to the touch.

(3) The reinforcing member may be provided over a range extending from the extending portion through the main body.

According to this aspect, the reinforcing member not only reinforces the stitched portions of the extending portions but also provides the reinforcement effect of the leather panel. The use of the reinforcing member of the size equivalent to the range between the extending portion and the main body can prevent complexification of the process of providing the reinforcing member to the member for leather panel. In other words, compared to when attaching each individual reinforcing member to the main body and the extending portion, the process of attaching the reinforcing member can be simplified. Positional displacement of the reinforcing member can be prevented as well.

(4) The main body and the extending portion may each have a leather material and a rear surface member secured to a rear surface of the leather material. In this case, the reinforcing member may be provided over a range including a rear-side surface of the main body that faces the ball body, a rear-side portion of the outer end surface of the main body, and an inner side surface of the extending portion that faces the rear-side portion of the outer end surface of the main body.

According to this aspect, the extending portions that each has the leather material and the rear surface member are stitched together with the stitching thread. Also, the reinforcing member is provided on the inner side surface of the extending portion that faces the outer end surface of the main body. Therefore, seam tear and stitch-skipping are not likely to occur in the extending portion of each leather panel. The presence of the rear surface member between the reinforcing member and the leather material can provide a feature of a ball for ball games, such as being soft to the touch. The reinforcing member is also provided on the rear surface of the main body that faces the ball body, to reinforce the ball.

(5) The main body and the extending portion may each have a leather material and a rear surface member secured to a rear surface of the leather material. In this case, the reinforcing member may be provided in the rear surface member of each of the main body and the extending portion.

According to this aspect, the extending portions that each has the leather material and the rear surface member are stitched together with the stitching thread. Because the reinforcing member is provided between the leather material and the rear surface member of each of the extending portions of the leather panels, seam tear and stitch-skipping are not likely to occur. Moreover, a depressed portion can be formed in the peripheral portion of the rear surface member by heating the rear surface member or increasing the temperature by applying a high-frequency voltage or ultrasonic wave to the rear surface member.

(6) The adhesive may be a heat active type adhesive.

According to this aspect, the adhesive can be applied to the outer circumferential portion of the outer surface of each leather panel prior to stitching the extending portions of the leather panels together. In other words, the extending portions of the leather panels can be stitched together after the adhesive applied to the outer circumferential portion of the outer surface of each leather panel is dried. Therefore, compared to when injecting the adhesive between the leather panels after stitching the leather panels together, the time it takes to create the outer layer can be reduced more. The adhesive is heated, with the adjacent leather panels being stitched together with the stitching thread, completing adhesion of the leather panels. Because the adjacent leather panels are bonded to each other while being pressed by the stitching thread, high adhesive strength can be obtained.

(7) It is preferred that the reinforcing member have an area density of 25 to 200 (25 or greater and 200 or less) g/m$^2$.

According to this aspect, keeping sufficient quality of the ball for ball games while preventing an excessive increase in the weight of the ball can be accomplished.

(8) The foregoing embodiment is a method for manufacturing a ball for ball games that has a ball body and a spherical shell-shaped outer layer having a plurality of leather panels and disposed on the outside of the ball body, the method having: a leather panel formation step of obtaining each of the leather panels by forming, in a member for leather panel, a main body and an extending portion reinforced with a reinforcing member; an application step of applying an adhesive to an outer surface of each of the extending portions; a joining step of bringing the outer surfaces of the extending portions of two leather panels to which the adhesive is applied into contact with each other; a stitching step of stitching together, with a stitching thread, the extending portions of the leather panels, the outer surfaces of which have come into contact with each other; and an insertion step of inserting the ball body into a spherical shell body that is obtained by repeating the joining step and the stitching step, to obtain a ball.

According to this manufacturing method, the outer surfaces of the extending portions to which the adhesive is applied are brought into contact with each other, and then the extending portions are stitched together with the stitching thread. Therefore, compared to when injecting the adhesive between adjacent leather panels after stitching the leather panels together, the manufacturing time can be reduced more. In addition, because the reinforcing member is provided in each of the extending portions to be stitched together, seam tear and stitch-skipping are not likely to occur during the stitching step.

(9) The leather panel formation step may include a step of attaching a rear surface member and the reinforcing member to a rear side of a leather material, and a step of cutting the leather material, the rear surface member, and the reinforcing member altogether into a shape corresponding to the shape of the leather panels.

According to this aspect, the reinforcing member is attached to the rear surface member, and thereafter the leather material, the rear surface member, and the reinforcing member are cut altogether into a shape corresponding to the shape of the leather panels. Therefore, compared to when attaching to the rear surface member the reinforcing member that is cut into the shape of the leather panels, the burden involved in the process of attaching the reinforcing member can be alleviated more. Specifically, because the reinforcing member is not yet cut at the time of attaching the reinforcing member, precise positioning of the reinforcing member is not necessary. This reduces the burden involved in the attaching process. Moreover, positional displacement of the reinforcing member can be prevented. Because the rear surface member is attached to the rear side of the leather material and then cut, positional displacement of the rear surface member itself can be prevented as well. In other words, in a case where the extending portion is formed by cutting the leather material and then attaching the cut rear surface member thereto, there is a possibility that positional displacement of the rear surface member might occur, causing difference in length of the extending portion. This leads to a fluctuation in the shape of the leather panels when the extending portion is bent, deteriorating the aesthetic aspect of the ball for ball games. On the other hand, in a case where the reinforcing member is attached to the rear surface member and thereafter the leather material, the rear surface member and the reinforcing member are cut altogether, positional displacement of the rear surface member does not occur, preventing deterioration of the aesthetic aspect of the ball for ball games.

(10) The leather panel formation step may further include an extending portion formation step of forming the main body and the extending portion in each of the leather panels by denting an outer circumferential portion of the rear surface member that is cut into the shape of the leather panels.

According to this aspect, the extending portion extending from the main body is formed by denting the outer circumferential portion of the rear surface member to which the reinforcing member has been attached. Accordingly, the extending portion that is reinforced with the rear surface member can be formed easily. In addition, the rear surface member is press-fitted between the fibers of the reinforcing member in the course of denting the rear surface member, resulting in enhancement of the securing strength between the rear surface member and the reinforcing member and the material strength of the reinforcing member itself. This is advantageous in terms of being able to enhance the reinforcement effect of the reinforcing member without causing an excessive increase in the weight of the ball.

The process of attaching the reinforcing member becomes complicated in the configuration in which the reinforcing member is attached to the rear surface member after denting the outer circumferential portion of the rear surface member, and in some cases the position for pasting the reinforcing member can be displaced. In the present embodiment, on the other hand, not only is it possible to alleviate the burden involved in the process of attaching the reinforcing member, but also positional displacement of the reinforcing member can be prevented, in the configuration of denting the outer circumferential portion of the rear surface member that has the reinforcing member attached thereto and is cut into a shape corresponding to the shape of the leather panels.

(11) In the extending portion formation step, the outer circumferential portion of the rear surface member to which the reinforcing member has been attached may be melted and dented.

According to this aspect, a depressed portion can easily be formed on the outer circumferential portion of the rear surface member to which the reinforcing member has been attached. Even when melting the rear surface member, the reinforcing member does not come off the rear surface member.

(12) In the stitching step, the leather panels may be sewn together along a boundary between an area of the reinforcing member that has a smooth outer circumferential portion and an area on the inside thereof that has surface irregularities. According to this aspect, the leather panels can be sewn together by taking advantage of the visual difference between the area of the reinforcing member that has a smooth outer circumferential portion and the area on the inside thereof that has surface irregularities.

(13) In the application step, the adhesive made of a heat active type adhesive may be applied, and the ball may be heated to melt the adhesive after the insertion step.

The adhesive is dry during the stitching step. Therefore, the adhesive can be prevented from adhering to an unintended area during the process of stitching the extending portions together. In addition, because the adhesive is melted to completely bond the extending portions to each other after the insertion step, the space between the leather panels can be closed neatly. At this moment, the sections of the extending portions that are stitched with the stitching thread can be completely covered by the adhesive. The adhesive is heated, with the adjacent leather panels being stitched together with the stitching thread, completing adhesion of the leather panels. As a result, the adjacent leather panels are bonded to each other while being pressed by the stitching thread, achieving high adhesive force.

The invention claimed is:

1. A ball for ball games, comprising:
a ball body; and
a spherical shell-shaped outer layer having a plurality of leather panels and disposed on an outside of the ball body,
wherein the plurality of leather panels each have a main body and an extending portion that is thinner than the main body and extends from a front-side portion of an outer end surface of the main body to configure an outer end surface of the leather panel, the extending portion having a front-side surface joining a front-side surface of the main body,
the extending portions of adjacent leather panels are bonded to each other with an adhesive and stitched together with a stitching thread passing through the adhesive, the adhesive being placed between the front-side surfaces of the extending portions and keeping the front-side surfaces of the extending portions from coming into direct contact with each other, and having a top surface to define a dimple space together with the opposite front-side surfaces of the extending portions, and
a reinforcing member is provided in the extending portion and is stitched on the extending portion for reinforcing an area of the extending portion stitched with the stitching thread.

2. The ball for ball games according to claim 1, wherein the main body and the extending portion each have a leather material and a rear surface member secured to a rear surface of the leather material, and
the reinforcing member is provided over a range including a rear-side portion of the outer end surface of the main body and an inner side surface of the extending portion that faces the rear-side portion of the outer end surface of the main body.

3. The ball for ball games according to claim 1, wherein the reinforcing member is provided over a range extending from the extending portion through the main body.

4. The ball for ball games according to claim 3, wherein the main body and the extending portion each have a leather material and a rear surface member secured to a rear surface of the leather material, and
the reinforcing member is provided over a range including a rear-side surface of the main body that faces the ball body, a rear-side portion of the outer end surface of the main body, and an inner side surface of the extending portion that faces the rear-side portion of the outer end surface of the main body.

5. The ball for ball games according to claim 2, wherein the main body and the extending portion each have a leather material and a rear surface member secured to a rear surface of the leather material, and
the reinforcing member is provided in the rear surface member of each of the main body and the extending portion.

6. The ball for ball games according to claim 1, wherein the adhesive is a heat active type adhesive.

7. The ball for ball games according to claim 1, wherein the reinforcing member has an area density of 25 to 200 g/m$^2$.

* * * * *